United States Patent
Delfino et al.

(10) Patent No.: US 11,491,820 B2
(45) Date of Patent: Nov. 8, 2022

(54) GRC (GLASS-RESIN COMPOSITE) MONOFILAMENT

(71) Applicants: COMPAGNIE GENERALE DES ETABLISSEMENTS MICHELIN, Clermont-Ferrand (FR); Michelin Recherche et Technique S.A., Granges-Paccot (FR)

(72) Inventors: Antonio Delfino, Clermont-Ferrand (FR); Jean-Paul Meraldi, Zurich (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 972 days.

(21) Appl. No.: 14/908,851

(22) PCT Filed: Jul. 8, 2014

(86) PCT No.: PCT/EP2014/064565
§ 371 (c)(1),
(2) Date: May 2, 2016

(87) PCT Pub. No.: WO2015/014578
PCT Pub. Date: Feb. 5, 2015

(65) Prior Publication Data
US 2016/0159152 A1      Jun. 9, 2016

(30) Foreign Application Priority Data

Aug. 1, 2013   (FR) ........................................ 1357647

(51) Int. Cl.
*B60C 9/00*       (2006.01)
*B60C 9/20*       (2006.01)
(Continued)

(52) U.S. Cl.
CPC ................ *B60C 9/005* (2013.01); *B60C 7/00* (2013.01); *B60C 7/24* (2013.01); *B60C 9/0028* (2013.01);
(Continued)

(58) Field of Classification Search
CPC ..... B60C 9/005; B60C 9/0028; B60C 9/0042; B60C 9/023; B60C 9/2003; B60C 15/04; B60C 7/00; C08J 5/043
See application file for complete search history.

(56) References Cited

U.S. PATENT DOCUMENTS 4,882,370 A * 11/1989 Jordan ................. C08G 59/226
                                                      523/200
5,556,496 A *  9/1996 Sumerak ............... B29C 70/525
                                                      156/166
(Continued)

FOREIGN PATENT DOCUMENTS

EP         0 822 056 A2      2/1998
EP         1 074 369 A1      2/2001
(Continued)

OTHER PUBLICATIONS

U.S. Appl. No. 14/908,859, filed Jul. 8, 2014.
(Continued)

*Primary Examiner* — Jennifer A Boyd
*Assistant Examiner* — Ricardo E Lopez
(74) *Attorney, Agent, or Firm* — Venable LLP

(57) ABSTRACT

A monofilament made of glass-resin composite has improved properties in compression, in particular at high temperature, and comprises glass filaments embedded in a crosslinked resin. The glass transition temperature of the resin is equal to or greater than 190° C. The elongation at break of the monofilament, measured at 23° C., is equal to or greater than 4.0%. The initial tensile modulus of the (Continued)

monofilament, measured at 23° C., is greater than 35 GPa. The real part of the complex modulus of the monofilament, measured at 190° C. by the DMTA method, is greater than 30 GPa. Pneumatic or non-pneumatic tires are reinforced with such a composite monofilament.

32 Claims, 3 Drawing Sheets

(51) Int. Cl.
  *C08J 5/04* (2006.01)
  *B60C 7/24* (2006.01)
  *B60C 7/00* (2006.01)
  *B60C 15/04* (2006.01)
  *D02G 3/40* (2006.01)
  *D02G 3/18* (2006.01)
  *B60C 9/02* (2006.01)
  *B29D 30/38* (2006.01)

(52) U.S. Cl.
  CPC .............. *B60C 9/0042* (2013.01); *B60C 9/02* (2013.01); *B60C 9/2003* (2013.01); *B60C 15/04* (2013.01); *C08J 5/043* (2013.01); *D02G 3/18* (2013.01); *D02G 3/404* (2013.01); *B29D 2030/383* (2013.01); *B60C 2009/0071* (2013.01); *B60C 2009/0078* (2013.01); *B60C 2009/208* (2013.01); *B60C 2009/2074* (2013.01); *B60C 2009/2077* (2013.01); *B60C 2009/2093* (2013.01); *B60C 2015/042* (2013.01); *C08J 2331/02* (2013.01); *D10B 2505/02* (2013.01); *D10B 2505/022* (2013.01)

(56) References Cited

U.S. PATENT DOCUMENTS

| | | | |
|---|---|---|---|
| 5,700,417 A | 12/1997 | Fernyhough et al. | 264/477 |
| 5,935,508 A | 8/1999 | Fernyhough et al. | 264/495 |
| 6,190,483 B1 | 2/2001 | Yang et al. | 156/180 |
| 6,640,859 B1 | 11/2003 | Laurent et al. | 152/276 |
| 6,769,465 B2 | 8/2004 | Rhyne et al. | 152/197 |
| 6,875,297 B1 | 4/2005 | Meuwly et al. | 156/180 |
| 6,926,853 B2 | 8/2005 | Hinc et al. | 264/102 |
| 6,994,135 B2 | 2/2006 | Delfino et al. | 152/276 |
| 7,032,634 B2 | 4/2006 | Laurent et al. | |
| 7,032,637 B2 | 4/2006 | Meraldi | 152/451 |
| 7,201,194 B2 | 4/2007 | Rhyne et al. | 152/5 |
| 7,484,949 B2 | 2/2009 | Hinc et al. | 425/114 |
| 8,277,590 B2 | 10/2012 | Delfino et al. | 156/173 |
| 8,517,068 B2 | 8/2013 | Delfino et al. | 152/5 |
| 8,585,947 B2 | 11/2013 | Meraldi et al. | 264/137 |
| 8,962,120 B2 | 2/2015 | Delfino et al. | 428/66.6 |
| 2002/0043319 A1 | 4/2002 | Meraldi | 152/527 |
| 2002/0124929 A1 | 9/2002 | Rhyne et al. | |
| 2003/0015827 A1 | 1/2003 | Hinc et al. | 264/479 |
| 2003/0213541 A1 | 11/2003 | Laurent et al. | |
| 2003/0226630 A1 | 12/2003 | Delfino et al. | |
| 2005/0173823 A1 | 8/2005 | Hinc et al. | 264/102 |
| 2009/0022921 A1* | 1/2009 | Meraldi | B29C 70/32 428/36.4 |
| 2010/0181006 A1 | 7/2010 | Delfino et al. | |
| 2010/0307653 A1 | 12/2010 | Delfino et al. | |
| 2013/0233458 A1 | 9/2013 | Meraldi et al. | 152/5 |
| 2013/0327459 A1 | 12/2013 | Rhyne et al. | 152/527 |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2015/0030851 A1 | 1/2015 | Abad et al. | |
| 2015/0053327 A1 | 2/2015 | Harada et al. | |
| 2015/0122394 A1 | 5/2015 | Huyghe et al. | B60C 15/04 |
| 2015/0144245 A1 | 5/2015 | Bucher et al. | B60C 15/04 |
| 2015/0174968 A1 | 6/2015 | Huyghe et al. | B60C 15/04 |
| 2016/0159152 A1 | 6/2016 | Delfino et al. | |
| 2016/0185051 A1 | 6/2016 | Delfino et al. | |
| 2016/0318342 A1 | 11/2016 | Delfino | |
| 2017/0050468 A1 | 2/2017 | Delfino | |
| 2018/0009264 A1 | 1/2018 | Delfino | |

FOREIGN PATENT DOCUMENTS

| | | |
|---|---|---|
| EP | 1162228 A1 | 12/2001 |
| EP | 1 167 080 A1 | 1/2002 |
| EP | 1 174 250 A1 | 1/2002 |
| EP | 1 242 254 A1 | 9/2002 |
| EP | 1 359 028 A1 | 11/2003 |
| FR | 2 765 346 A1 | 12/1998 |
| GB | 2 297 332 A | 7/1996 |
| JP | 4-202825 A | 7/1992 |
| WO | 00/37269 A1 | 6/2000 |
| WO | 01/42033 A1 | 6/2001 |
| WO | 2007/085414 A1 | 8/2007 |
| WO | 2008/080535 A1 | 7/2008 |
| WO | 2009/033620 A1 | 3/2009 |
| WO | 2009/135561 A2 | 11/2009 |
| WO | 2012/032000 A1 | 3/2012 |
| WO | 2012/115615 A1 | 8/2012 |
| WO | 2013/017421 A1 | 2/2013 |
| WO | 2013/017422 A1 | 2/2013 |
| WO | 2013/017423 A1 | 2/2013 |
| WO | 2013/117474 A1 | 8/2013 |
| WO | 2015/014578 A1 | 2/2015 |
| WO | 2015/165777 A1 | 11/2015 |

OTHER PUBLICATIONS

T.B. Rhyne, et al., "Development of a Non-Pneumatic Wheel", Tire Science and Technology, TSTCA, vol. 34, No. 3, pp. 150-169 (2006).

Ronald H. Thompson, et al., "Critical compressive stress for continuous fiber unidirectional composites", J. Composite Materials, vol. 46, No. 26, pp. 3231-3245 (2012).

D. Sinclair, "A Bending Method for Measurement of the Tensile Strength and Young's Modulus of Glass Fibers", J. Appl. Phys., vol. 21, pp. 380-386 (1950).

* cited by examiner

GRC (GLASS-RESIN COMPOSITE) MONOFILAMENT

1. FIELD OF THE INVENTION

The field of the present invention is that of composite reinforcers which may be used especially for reinforcing semi-finished products or finished articles made of rubber such as vehicle tyres of the pneumatic or non-pneumatic type.

It more particularly relates to monofilaments of the GRC type (abbreviation for glass-resin composite) with high mechanical properties comprising continuous unidirectional multifilament glass fibres embedded in a resin, which can be used in particular as reinforcing elements (or "reinforcers") for these tyres.

2. PRIOR ART

Tyre designers have long sought low density textile or composite type reinforcers which could advantageously and effectively replace the conventional metal wires or cords, with a view to reducing especially the weight of these tyres and also to remedying any problems of corrosion.

Thus, patent application EP 1 167 080 (or U.S. Pat. No. 7,032,637) has already described a GRC monofilament with high mechanical properties, comprising continuous unidirectional glass fibres, impregnated in a crosslinked resin of vinyl ester type. As well as a high breaking stress in compression which is greater than its breaking stress in extension, this GRC monofilament has an elongation at break of the order of 3.0 to 3.5% and an initial tensile modulus of at least 30 GPa; its thermoset resin has a Tg (glass transition temperature) of greater than 130° C. and an initial tensile modulus of at least 3 GPa.

By virtue of the above properties, this application EP 1 167 080 showed that it was advantageously possible to replace steel cords with such GRC monofilaments as novel reinforcing elements for tyre belts, thereby making it possible to significantly lighten the structure of the tyres.

Patent application EP 1 174 250 (equivalents U.S. Pat. Nos. 6,926,853 or 7,484,949) for its part suggested a continuous manufacturing process for such GRC monofilaments, comprising the following essential steps:
creating a rectilinear arrangement of glass fibres and conveying this arrangement in a feed direction:
in a vacuum chamber, degassing the arrangement of fibres by the action of the vacuum;
at the outlet of the vacuum chamber, after degassing, passing through an impregnation chamber under vacuum so as to impregnate said arrangement of fibres with the liquid resin to obtain a prepreg containing the fibres and the resin;
passing said prepreg through a sizing die having a cross section of predefined area and shape, to provide it with the shape of a monofilament (for example a monofilament with a round cross section or a ribbon with a rectangular cross section);
downstream of the die, in a UV irradiation chamber, stabilizing and solidifying the monofilament by photopolymerization of the resin under the action of the UV rays;
then winding the monofilament obtained in this way, for storage.

Experience has shown, nonetheless, that the GRC monofilaments described in the above patent applications can be further improved, in particular for their use in vehicle tyres.

It was noted in particular, unexpectedly, that these prior art GRC monofilaments, when they were used as belt reinforcers for certain pneumatic tyres, could undergo a certain number of compression breakages by a visible collapse of their structure during the very manufacturing of these tyres, more specifically during the final step of curing these tyres in a mould which, as is known, is carried out at high pressure and a very high temperature, typically of greater than 160° C.

It is finally desirable to be able to manufacture these monofilaments at higher speed in order to be able to reduce the final industrial cost thereof, and consequently also that of the semi-finished products or finished articles made of rubber comprising them.

3. BRIEF DESCRIPTION OF THE INVENTION

Now, in the pursuit of their research, the applicants have discovered a novel GRC monofilament with improved Tg, elongation at break and modulus properties, giving this monofilament properties in compression, in particular at high temperature, which are significantly improved compared to those of the GRC monofilaments of the prior art, and which makes it possible to remedy the abovementioned problem. This monofilament may be manufactured at high speed.

Thus, according to a first subject, the present invention relates to a monofilament made of glass-resin composite (hereinafter abbreviated to GRC) comprising glass filaments embedded in a crosslinked resin, characterized in that:
the glass transition temperature (denoted Tg), of the resin is equal to or greater than 190° C.;
the elongation at break (denoted Eb), of the monofilament, measured at 23° C., is equal to or greater than 4.0%;
the initial tensile modulus (denoted $E_{23}$), of the monofilament, measured at 23° C., is greater than 35 GPa; and
the real part of the complex modulus (denoted $E'_{190}$), of the monofilament, measured at 190° C. by the DMTA method, is greater than 30 GPa.

The invention also relates to the use of such a GRC monofilament as reinforcer (that is to say, a reinforcing element) for semi-finished products or finished articles made of rubber such as pneumatic or non-pneumatic tyres.

The invention also relates to these semi-finished products, rubber articles and tyres themselves, both in the raw state (that is to say before curing or vulcanization) and in the cured state (after curing). The tyres of the invention, in particular, may be intended for motor vehicles of the passenger, 4×4 and SUV (Sport Utility Vehicle) type, but also for industrial vehicles chosen from vans, "heavy" vehicles— i.e., underground trains, buses, heavy road transport vehicles (lorries, towing vehicles, trailers), off-road vehicles —, agricultural or civil engineering machines, aircraft and other transport or handling utility vehicles.

The GRC monofilament of the invention can most particularly be used as a reinforcing element in crown (or belt) reinforcements or in carcass reinforcements of pneumatic tyres, such as those described especially in documents EP 1 167 080 (or U.S. Pat. No. 7,032,637) and WO 2012/115615.

The GRC monofilament of the invention can also advantageously be used, due to its low density and its improved properties in compression, as a reinforcing element in tyres or flexible wheels of non-pneumatic type, that is to say tyres which are structurally supported (without internal pressure). Such tyres are well known to those skilled in the art (see for example EP 1 242 254 or U.S. Pat. No. 6,769,465, EP 1 359 028 or U.S. Pat. No. 6,994,135, EP 1 242 254 or U.S. Pat. No. 6,769,465), U.S. Pat. No. 7,201,194, WO 00/37269 or U.S. Pat. No. 6,640,859, WO 2007/085414, WO 2008/080535, WO 2009/033620, WO 2009/135561, WO 2012/032000); when they are combined with any rigid mechanical element intended to create a link between the flexible tyre and the hub of a wheel, they replace the assembly made up of the pneumatic tyre, the wheel rim and the disc as they are known in the majority of contemporary road vehicles.

The GRC monofilament of the invention can particularly be used as an essentially inextensible reinforcing element of the membranes used in the annular band (or shear band) of a non-pneumatic tyre such as that described in U.S. Pat. No. 7,201,194, such a tyre having the feature of including an annular band that supports the load on the tyre and a plurality of support elements or spokes, having very low stiffness in compression, which operate in tension to transmit the forces between the annular band and the wheel hub.

BRIEF DESCRIPTION OF THE FIGURES

The invention and the advantages thereof will be readily understood in light of the following detailed description and exemplary embodiments, and also FIGS. 1 to 3 which relate to these examples and which show, in a schematic manner (without being true to scale):
  a device which can be used for manufacturing a GRC monofilament according to the invention (FIG. 1);
  in cross section, a GRC monofilament according to the invention obtained by means of this device (FIG. 2);
  in radial section, an example of a pneumatic tyre in accordance with the invention, incorporating a GRC monofilament according to the invention (FIG. 3).

4. DETAILED DESCRIPTION OF THE INVENTION

Figure 1:
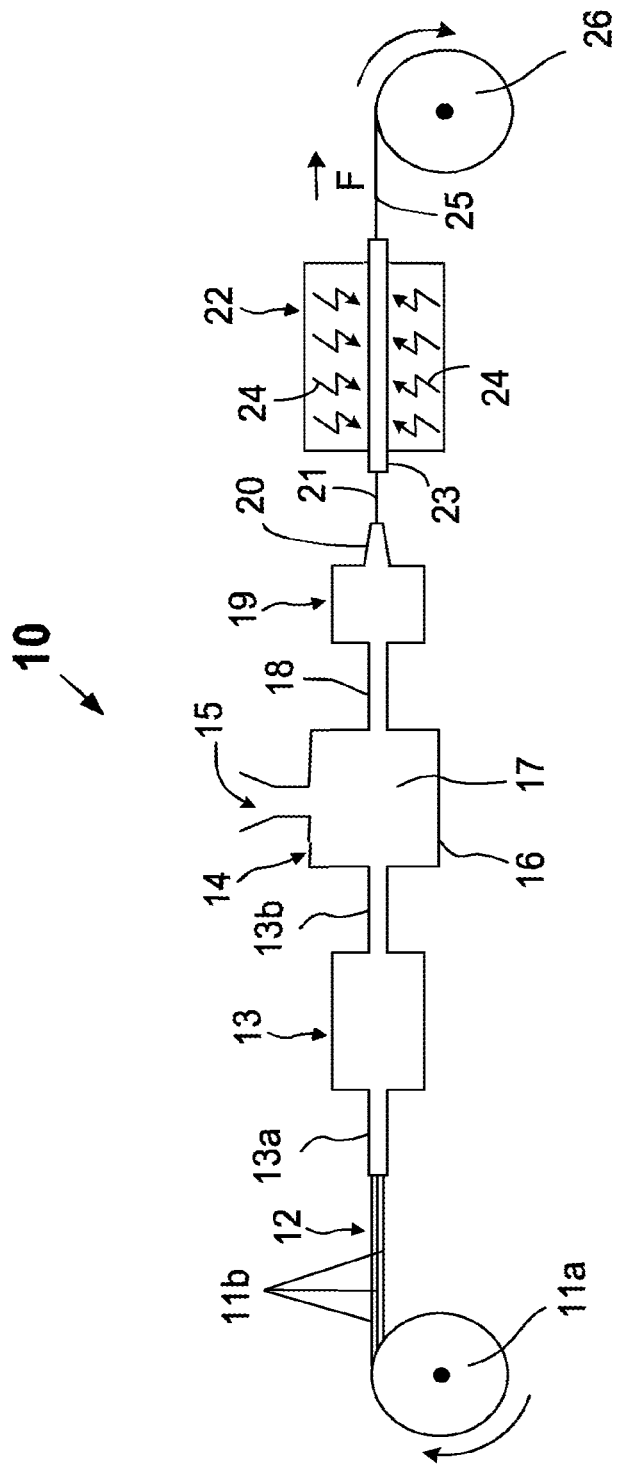

In the present patent application, unless expressly indicated otherwise, all the percentages (%) shown are percentages by weight.

Any range of values denoted by the expression "between a and b" represents the range of values extending from more than a to less than b (that is to say excluding the end points a and b) whereas any range of values denoted by the expression "from a to b" means the range of values extending from a up to b (that is to say including the strict end points a and b).

The invention thus relates to a monofilament made of glass-resin composite (abbreviated to GRC) comprising glass filaments embedded in a crosslinked resin, characterized in that:
  the glass transition temperature (denoted Tg), of the resin is equal to or greater than 190° C.;
  the elongation at break (denoted Eb), of the monofilament, measured at 23° C., is equal to or greater than 4.0%;
  the initial tensile modulus (denoted $E_{23}$), of the monofilament, measured at 23° C., is greater than 35 GPa; and
  the real part of the complex modulus (denoted $E'_{190}$), of the monofilament, measured at 190° C. by the DMTA method, is greater than 30 GPa.

Typically, the glass filaments are present in the form of a single multifilament fibre or several multifilament fibres (if there are several, they are preferably essentially unidirectional), each of them being able to comprise several tens, hundreds or even thousands of unitary glass filaments. These very fine unitary filaments generally, and preferably, have a mean diameter of the order of 5 to 30 μm, more preferably from 10 to 20 μm.

The term "resin" here is intended to mean the resin in unmodified form and any composition based on this resin and comprising at least one additive (that is to say one or more additives). The term "crosslinked resin" is intended to mean, of course, that the resin is cured (photocured and/or thermoset), in other words is in the form of a network of three-dimensional bonds, in a state specific to "thermosetting" polymers (as opposed to "thermoplastic" polymers).

The glass transition temperature, denoted Tg, of the resin is preferably greater than 190° C., more preferably greater than 195° C., in particular greater than 200° C. It is measured, in a known way, by DSC (Differential Scanning calorimetry) at the second pass, for example, and unless otherwise indicated in the present application, according to standard ASTM D3418 of 1999 (DSC apparatus "822-2" from Mettler Toledo; nitrogen atmosphere; samples first brought from ambient temperature (23° C.) to 250° C. (10° C./min), then rapidly cooled down to 23° C., before final recording of the DSC curve from 23° C. to 250° C., at a ramp of 10° C./min).

The elongation at break, denoted Eb, of the GRC monofilament, measured at 23° C., is preferably greater than 4.0%, more preferably greater than 4.2%, in particular greater than 4.4%. The initial tensile modulus thereof, $E_{23}$, measured at 23° C., is preferably greater than 36 GPa; more preferably still, it is greater than 40 GPa, preferably greater than 42 GPa.

The tensile mechanical properties of the GRC monofilament (modulus $E_{23}$ and elongation at break Eb) are measured, in a known way, by means of an Instron type 4466 tensile testing machine (software BLUEHILL-2 supplied with the tensile testing machine), according to standard ASTM D 638, on GRC monofilaments as manufactured, that is to say which have not been sized, or else sized (that is to say ready to use) GRC monofilaments, or else GRC monofilaments extracted from the semi-finished product or rubber article which they reinforce. Before measurement, these monofilaments are subjected to prior conditioning (storage of the monofilaments for at least 24 hours in a standard atmosphere in accordance with European standard DIN EN 20139 (temperature of 23±2° C.; relative humidity of 50±5%)). The samples tested undergo tensioning over an initial length of 400 mm at a nominal speed of 100 m/min, under a standard pre-tension of 0.5 cN/tex. All the results given are averaged over 10 measurements.

The modulus $E'_{190}$ is preferably greater than 33 GPa, more preferably greater than 36 GPa.

According to another preferred embodiment, for an optimized compromise between thermal and mechanical properties of the GRC monofilament of the invention, the $E'_{(Tg'-25)}/E'_{23}$ ratio is greater than 0.85, preferably greater than 0.90, $E'_{23}$ and $E'_{(Tg'-25)}$ being the real part of the complex modulus of the monofilament measured by DMTA, respectively at 23° C. and at a temperature expressed in ° C. equal to (Tg'−25), in which expression Tg' represents the glass transition temperature, this time measured by DMTA.

According to another, more preferred embodiment, the $E'_{(Tg'-10)}/E'_{23}$ ratio is greater than 0.80, preferably greater than 0.85, $E'_{(Tg'10)}$ being the real part of the complex modulus of the monofilament measured by DMTA at a temperature expressed in ° C. equal to (Tg'−10).

The measurements of E' and Tg' are carried out in a known way by DMTA ("Dynamic Mechanical Thermal Analysis"), with a "DMA+450" viscosity analyser from ACOEM (France), using the "Dynatest 6.83/2010" software to control the flexural, tension or torsion tests.

According to this device, since the three point flexural test does not make it possible in a known way to enter initial geometric data for a monofilament of circular section, only the geometry of a rectangular (or square) section may be entered. In order to obtain a precise measurement of the modulus E' for a monofilament of diameter D, the convention is therefore to introduce into the software a square cross section with a side length "a" having the same surface moment of inertia, so as to be able to work with the same stiffness R of the samples tested.

The following well known relationships must apply (E being the modulus of the material, $I_s$ the surface moment of inertia of the object in question, and * the multiplication symbol):

$$R=E_{composite}*I_{circular\ section}=E_{composite}*I_{square\ section}$$

with: $I_{circular\ section}=\pi*D^4/64$ and $I_{square\ section}=a^4/12$

The value of the side "a" of the equivalent square with the same surface inertia as that of the (circular) section of the monofilament of diameter D is easily deduced therefrom, according to the equation:

$$a=D*(\pi/6)^{0.25}.$$

In the event that the cross section of the sample tested is not circular (or rectangular), irrespective of the specific shape thereof, the same calculation method will be applied, with prior determination of the surface moment of inertia $I_s$ on a cross section of the sample tested.

The test specimen to be tested, generally of circular section and diameter D, has a length of 35 mm. It is arranged horizontally on two supports 24 mm apart from one another. A repeated flexural stress is applied at right angles to the centre of the test specimen, halfway between the two supports, in the form of a vertical displacement with an amplitude equal to 0.1 mm (thus an assymetrical deformation, the interior of the test specimen being stressed solely in compression and not in extension) at a frequency of 10 Hz.

The following programme is then applied: under this dynamic stress, the test specimen is gradually heated from 25° C. to 260° C. with a ramp of 2° C./min. At the end of the test, measurements for the modulus of elasticity E', the viscous modulus E" and the loss angle (δ) are obtained as a function of the temperature (where E' is the real part and E" the imaginary part of the complex modulus); Tg' is the glass transition temperature corresponding to the maximum (peak) tan(δ).

According to a preferred embodiment, the elastic deformation in compression under flexion is greater than 3.0%, more preferably greater than 3.5%, in particular greater than 4.0%. According to a preferred embodiment, the breaking stress in compression under flexion is greater than 1000 MPa, more preferably greater than 1200 MPa, in particular greater than 1400 MPa.

The above properties in compression under flexion are measured on the GRC monofilament as described in the aforementioned application EP 1 167 080 by the method referred to as the loop test (D. Sinclair, J. App. Phys. 21, 380, 1950). In the present case, a loop is produced and is brought gradually to its breaking point. The nature of the break, which is readily observable due to the large size of the section, makes it immediately possible to realise that the GRC monofilament of the invention, stressed in flexion until it breaks, breaks on the side where the material is in extension, which can be identified by simple observation.

Given that in this case the dimensions of the loop are large, it is possible at any time to read the radius of the circle inscribed in the loop. The radius of the circle inscribed just before the breaking point corresponds to the critical radius of curvature, denoted by Rc.

The following formula then makes it possible to determine, by the calculation, the critical elastic deformation denoted Ec (where r corresponds to the radius of the monofilament, that is to say D/2):

$$Ec=r/(Rc+r)$$

The breaking stress in compression under flexion, denoted $\sigma_c$, is obtained by calculation using the following formula (where E is the initial tensile modulus):

$$\sigma_c=Ec*E$$

Since, in the case of the GRC monofilament according to the invention, the loop breaks in the part in extension, the conclusion is drawn that, in flexion, the breaking stress in compression is greater than the breaking stress in extension.

Breaking in flexion of a rectangular bar by the method referred to as the three-point method (ASTM D 790) may also be carried out. This method also makes it possible to verify, visually, that the nature of the break is indeed in extension.

According to a preferred embodiment, the breaking stress in pure compression is greater than 700 MPa, more preferably greater than 900 MPa, in particular greater than 1100 MPa. To avoid buckling of the GRC monofilament under compression, this magnitude is measured according to the method described in the publication "*Critical compressive stress for continuous fiber unidirectional composites*" by Thompson et al., Journal of Composite Materials, 46(26), 3231-3245.

Preferably, in the GRC monofilament of the invention, the degree of alignment of the glass filaments is such that more than 85% (% by number) of the filaments have an inclination relative to the axis of the monofilament which is less than 2.0 degrees, more preferably less than 1.5 degrees, this inclination (or misalignment) being measured as described in the above publication by Thompson et al.

Preferably, the glass fibres (i.e. filaments) weight content in the GRC monofilament is between 60 and 80%, preferably between 65 and 75%.

This weight content is calculated using the ratio of the count of the initial glass fibre to the count of the final GRC monofilament. The count (or linear density) is determined on at least three samples, each corresponding to a length of 50 m, by weighing this length; the count is given in tex (weight in grams of 1000 m of product—as a reminder, 0.111 tex is equal to 1 denier).

Preferably, the density (in g/cm³) of the GRC monofilament is between 1.8 and 2.1. It is measured (at 23° C.) by means of a specialized balance from Mettler Toledo of the "PG503 DeltaRange" type; the samples of a few cm are successively weighed in air and immersed in ethanol, then the software of the apparatus determines the mean density over three measurements.

The diameter D of the GRC monofilament of the invention is preferably between 0.2 and 1.5 mm, more preferably between 0.3 and 1.2 mm, in particular between 0.4 and 1.1 mm.

This definition equally covers monofilaments of essentially cylindrical shape (with circular cross section) and monofilaments of other shapes, for example oblong monofilaments (with a more or less flattened shape) or of rectangular cross section. In the case of a non-circular section and unless specifically indicated otherwise, by convention D is the diameter known as clearance diameter, that is to say the diameter of the imaginary cylinder of revolution that surrounds the monofilament, in other words the diameter of the circumscribed circle surrounding its cross section.

The resin used is, by definition, a crosslinkable (i.e. curable) resin which is capable of being crosslinked, cured by any known method, in particular by UV (or UV-visible) radiation, preferably emitting in a spectrum ranging at least from 300 nm to 450 nm.

As crosslinkable resin, use is preferably made of a polyester or vinyl ester resin, more preferably a vinyl ester resin. The term "polyester" resin is intended to mean, in a known way, a resin of unsaturated polyester type. As for vinyl ester resins, they are well known in the field of composite materials.

Without this definition being limiting, the vinyl ester resin is preferably of the epoxy vinyl ester type. Use is more preferably made of a vinyl ester resin, in particular of the epoxy type, which, at least in part, is based on novolac (also known as phenoplast) and/or bisphenol (that is to say is grafted onto a structure of this type), or preferably a vinyl ester resin based on novolac, bisphenol, or novolac and bisphenol.

Preferably, the initial tensile modulus of the resin, measured at 23° C., is greater than 3.0 GPa, more preferably greater than 3.5 GPa.

An epoxy vinyl ester resin based on novolac (the part between brackets in Formula I below) corresponds for example, in a known way, to the following Formula (I):

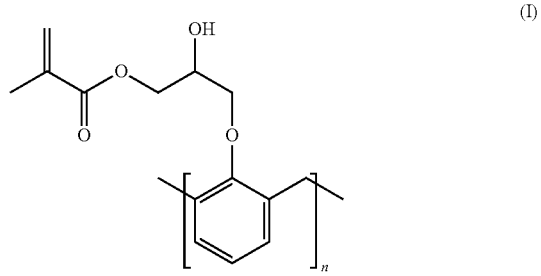

(I)

An epoxy vinyl ester resin based on bisphenol A (the part between brackets in Formula (II) below) corresponds for example to the formula (the "A" serving as a reminder that the product is manufactured using acetone):

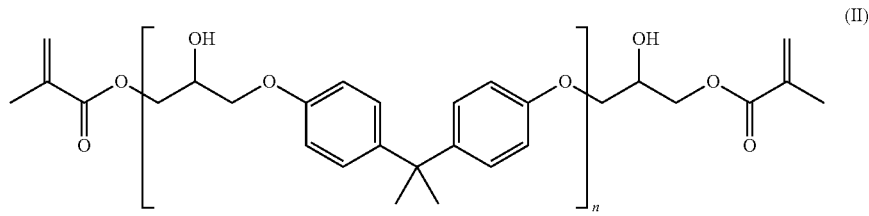

(II)

An epoxy vinyl ester of novolac and bisphenol type has demonstrated excellent results. By way of example of such a resin, mention may especially be made of the vinyl ester resins Atlac 590 and E-Nova FW 2045 from DSM (diluted with approximately 40% styrene) described in the abovementioned applications EP-A-1 074 369 and EP-A-1 174 250. Epoxy vinyl ester resins are available from other manufacturers such as, for example, AOC (USA-"Vipel" resins).

The GRC monofilament of the invention is able to be prepared according to a process comprising the following known steps:

creating a rectilinear arrangement of glass fibres (filaments) and conveying this arrangement in a feed direction;

in a vacuum chamber, degassing the arrangement of fibres by the action of the vacuum;

at the outlet of the vacuum chamber, after degassing, passing through an impregnation chamber under vacuum so as to impregnate said arrangement of fibres with a resin or a thermosetting resin composition, in the liquid state, to obtain a prepreg containing the glass filaments and the resin;

passing said prepreg through a sizing die having a cross section of predefined area and shape, to provide it with the shape of a monofilament (for example a monofilament with a round cross section or a ribbon with a rectangular cross section);

downstream of the die, in a UV irradiation chamber, polymerizing the resin under the action of the UV rays;

then winding the monofilament obtained in this way, for storage.

All the above steps (arranging, degassing, impregnating, sizing, polymerizing and final winding) of the process of the invention are steps which are known to those skilled in the art, as are the materials (multifilament fibres and resin compositions) used; they have been described, for example, in either of the two abovementioned applications EP-A-1 074 369 and EP-A-1 174 250.

It will be recalled especially that before any impregnation of the fibres, an essential step of degassing the arrangement of fibres by the action of the vacuum must be carried out, in order especially to boost the effectiveness of the later impregnation, and above all to guarantee the absence of any bubbles within the finished composite monofilament.

After passing through the vacuum chamber, the glass filaments enter an impregnation chamber which is completely full of impregnation resin, and therefore devoid of air: this is how this impregnation step can be defined as "impregnation under vacuum".

The impregnation resin (resin composition) preferably comprises a photoinitiator which is sensitive (reactive) to UV above 300 nm, preferably between 300 and 450 nm. This photoinitiator is used at an amount preferably of from 0.5% to 3%, more preferably from 1% to 2.5%. The resin may also comprise a crosslinking agent, for example at an amount of between 5% and 15% (% by weight of impregnation composition).

Preferably, this photoinitiator is from the family of the phosphine compounds, more preferably a bis(acyl)phosphine oxide, such as for example bis(2,4,6-trimethylbenzoyl)phenylphosphine oxide ("Irgacure 819" from BASF) or a mono(acyl)phosphine oxide (for example "Esacure TPO" from Lamberti), such phosphine compounds possibly being used in a mixture with other photoinitiators, for example photoinitiators of the alpha-hydroxy ketone type, such as for example dimethylhydroxyacetophenone (e.g. "Esacure KL200" from Lamberti) or 1-hydroxycyclohexyl phenyl ketone (e.g. "Esacure KS300" from Lamberti), benzophenones such as 2,4,6-trimethylbenzophenone (e.g. "Esacure TZT" from Lamberti) and/or thioxanthone derivatives such as, for example, isopropylthioxanthone (e.g. "Esacure ITX" from Lamberti).

The die known as the "sizing" die makes it possible, by having a cross section of determined dimensions, generally and preferably circular or rectangular, to adjust the proportion of resin with respect to the glass fibres while at the same time imposing on the prepreg the shape and thickness required for the monofilament.

The polymerization or UV irradiation chamber then has the function of polymerizing and crosslinking the resin under the action of the UV rays. It comprises one or preferably several UV irradiators, each composed for example of a UV lamp with a wavelength of 200 to 600 nm.

The finished GRC monofilament thus formed through the UV irradiation chamber, in which the resin is now in the solid state, is then recovered for example on a receiving spool, on which it may be wound over a very great length.

Between the sizing die and the final receiving support, it is preferred to keep the tensions to which the glass fibres are subjected at a moderate level, preferably between 0.2 and 2.0 cN/tex, more preferably between 0.3 and 1.5 cN/tex; in order to control this, it will be possible for example to measure these tensions directly at the outlet of the irradiation chamber, by means of suitable tension meters well known to those skilled in the art.

Aside from the known steps described above, the process for manufacturing the GRC monofilament of the invention comprises the following essential steps:
- the speed ($S_{ir}$) of passage of the monofilament through the irradiation chamber is greater than 50 m/min;
- the duration ($D_{ir}$) of passage of the monofilament through the irradiation chamber is equal to or greater than 1.5 s;
- the irradiation chamber comprises a tube which is transparent to UV rays (such as a quartz tube or preferably a glass tube), referred to as an irradiation tube, through which the monofilament moves during formation, this tube having a stream of inert gas flowing through it, preferably nitrogen.

If these essential steps are not combined, the improved properties of the GRC monofilament of the invention, namely the improved Tg, elongation Eb and moduli (E and E') properties cannot be achieved.

In particular, in the absence of sweeping with an inert gas such as nitrogen in the irradiation tube, it has been observed that the above properties of the GRC monofilament worsened quite quickly during manufacture and thus that industrial performance was no longer guaranteed.

Moreover, if the duration of irradiation $D_{ir}$ of the monofilament in the irradiation chamber is too short (less than 1.5 s), numerous tests revealed (see results in the table below for tests carried out at different speeds $S_{ir}$ greater than 50 m/min) that either the Tg values were insufficient, at lower than 190° C., or the Eb values were too low, at lower than 4.0%.

TABLE

| $D_{ir}$ (s) | Tg (° C.) | Eb (%) |
|---|---|---|
| Test 1 | | |
| 1.2 | 186.1 | 3.4 |
| 1.3 | 188.8 | 3.8 |
| 1.45 | 189.1 | 3.9 |
| 1.7 | 194.8 | 4.3 |
| 2.0 | 195.7 | 4.5 |
| Test 2 | | |
| 1.5 | 190.0 | 4.0 |
| 1.65 | 192.7 | 4.1 |
| 1.8 | 195.0 | 4.1 |
| 2.0 | 199.2 | 4.3 |
| Test 3 | | |
| 2.0 | 192.8 | 4.3 |
| 2.4 | 193.7 | 4.5 |
| 3.0 | 196.9 | 4.6 |
| 4.0 | 195.0 | 4.7 |
| Test 4 | | |
| 1.0 | 184.7 | 4.3 |
| 1.2 | 187.3 | 4.2 |
| 1.6 | 190.5 | 4.2 |
| 2.0 | 200.5 | 4.3 |

It was also observed that a high speed of irradiation $S_{ir}$ (greater than 50 m/min, preferably between 50 and 150 m/min) was favourable, on the one hand, for an excellent degree of alignment of the glass filaments inside the GRC monofilament, and, on the other hand, for a better retention of the vacuum inside the vacuum chamber, with a significantly reduced risk of having a certain fraction of the impregnation resin coming back from the impregnation chamber towards the vacuum chamber, and therefore for a better quality of impregnation.

The diameter of the irradiation tube (preferably made of glass) is preferably between 10 and 80 mm, preferably between 20 and 60 mm.

Preferably, the speed $S_{ir}$ is between 50 and 150 m/min, more preferably in the range from 60 to 120 m/min.

Preferably, the duration of irradiation $D_{ir}$ is between 1.5 and 10 s, more preferably in the range from 2 to 5 s.

According to another preferred embodiment, the irradiation chamber comprises a plurality of UV irradiators (or radiators), that is to say at least two (two or more than two) which are arranged in a row around the irradiation tube. Each UV irradiator typically comprises one (at least one) UV lamp (preferably emitting in a spectrum from 200 to 600 nm) and a parabolic reflector at the focal point of which is the centre of the irradiation tube; it delivers a linear power density preferably of between 2000 and 14 000 watts per metre. More preferably still, the irradiation chamber comprises at least three, in particular at least four UV irradiators in a row.

Even more preferably, the linear power density delivered by each UV irradiator is between 2500 and 12 000 watts per metre, in particular in a range from 3000 to 10 000 watts per metre.

UV radiators which are suitable for the process of the invention are well known to those skilled in the art, for example those sold by the company Dr. Hönle AG (Germany) under the reference "1055 LCP AM UK", fitted with "UVAPRINT" lamps (iron-doped high pressure mercury lamps). The nominal (maximum) power of each radiator of this type is equal to approximately 13 000 watts, the power output actually being able to be regulated with a potentiometer between 30% and 100% of the nominal power.

Preferably, the temperature of the resin (resin composition), in the impregnation chamber, is between 50° C. and 95° C., more preferably between 60° C. and 90° C.

According to another preferred embodiment, the conditions of irradiation are adjusted such that the temperature of the GRC monofilament at the outlet of the impregnation chamber is greater than the Tg of the crosslinked resin; more preferably, this temperature is greater than the Tg of the crosslinked resin and less than 270° C.

5. EXAMPLES OF THE IMPLEMENTATION OF THE INVENTION

Examples of the manufacture of GRC monofilaments according to the invention and the use thereof as reinforcers in pneumatic tyres will be described hereinafter.

Appended FIG. 1 schematically illustrates in a very simple manner an example of a device 10 which makes possible the production of GRC monofilaments in accordance with the invention.

In this figure, a spool 11a can be seen, containing, in the example illustrated, glass fibres 11b (in the form of multifilaments). The spool is unwound continuously by conveying, so as to produce a rectilinear arrangement 12 of these fibres 11b. In general, reinforcing fibres are delivered in "rovings", that is to say already in groups of fibres wound in parallel onto a spool; for example, fibres sold by Owens Corning under the name "Advantex" fibres are used, which have a count equal to 1200 tex (as a reminder, 1 tex=1 g/1000 m of fibre). It is for example the tensioning applied by the turning receiver 26 which will enable the fibres to progress in parallel and enable the GRC monofilament to move along the length of the installation 1.

This arrangement 12 then passes through a vacuum chamber 13 (connected to a vacuum pump, not shown), arranged between an inlet tubing 13a and an outlet tubing 13b which opens into an impregnation chamber 14, the two tubings preferably with rigid walls having, for example, a minimal section greater than (typically twice as large as) the total section of the fibres and a length very much greater than (typically 50 times longer than) said minimal section.

As already taught by the aforementioned application EP-A-1 174 250, the use of tubings with rigid walls both for the inlet opening into the vacuum chamber and for the outlet opening of the vacuum chamber and the transfer from the vacuum chamber to the impregnation chamber proves to be compatible at the same time with high passage rates of the fibres through the orifices without breaking the fibres, and also makes it possible to ensure sufficient sealing. All that is required, if need be experimentally, is to find the largest passage section, given the total section of fibres to be treated, that will still allow sufficient sealing to be achieved, given the rate of progress of the fibres and the length of the tubings. Typically, the vacuum inside the chamber 13 is, for example, of the order of 0.1 bar, and the length of the vacuum chamber is approximately 1 metre.

On exiting the vacuum chamber 13 and the outlet tubing 13b, the arrangement 12 of fibres 11b passes through an impregnation chamber 14 comprising a feed tank 15 (connected to a metering pump, not depicted) and a sealed impregnation tank 16 completely full of impregnation composition 17 based on a curable resin of the vinyl ester type (e.g. DSM's "E-Nova FW 2045"). By way of example, the composition 17 further comprises (in a weight content of 1 to 2%) a photoinitiator suitable for UV and/or UV-visible radiation with which the composition will subsequently be treated, for example bis(2,4,6-trimethylbenzoyl)phenylphosphine oxide ("Irgacure 819" from BASF). It may also comprise (for example approximately 5% to 15% of) a crosslinking agent such as, for example, tris(2-hydroxyethyl)isocyanurate triacrylate ("SR 368" from Sartomer). Of course, the impregnation composition 17 is in the liquid state.

Preferably, the impregnation chamber is several metres long, for example between 2 and 10 m, in particular between 3 and 5 m.

Thus, a prepreg which comprises for example (in % by weight) from 65% to 75% solid fibres 11b, the remainder (25% to 35%) being formed of the liquid impregnation matrix 17, leaves the impregnation chamber 14, in a sealed outlet tubing 18 (still under rough vacuum).

The prepreg then passes through sizing means 19 comprising at least one sizing die 20, the passage of which (not depicted here), for example of circular, rectangular or conical shape, is suited to the specific embodiment conditions. By way of example, this passage has a minimal cross section of circular shape, the downstream orifice of which has a diameter slightly greater than that of the targeted monofilament. Said die has a length which is typically at least 100 times greater than the minimum dimension of the minimum section. Its purpose is to give the finished product good dimensional accuracy, and may also serve to dose the fibre content with respect to the resin. According to one possible alternative form of embodiment, the die 20 can be directly incorporated into the impregnation chamber 14, thereby for example avoiding the need to use the outlet tubing 18.

Preferably, the sizing zone is several centimetres long, for example between 5 and 50 cm, in particular between 5 and 20 cm.

By virtue of the sizing means (19, 20) a "liquid" composite monofilament 21 (liquid in the sense that its impregnation resin is still liquid) is obtained, the shape of the cross section of which is preferably essentially circular.

At the outlet of the sizing means (19, 20), the liquid composite monofilament 21 obtained in this way is then polymerized by passing through a UV irradiation chamber (22) comprising a sealed glass tube (23) through which the composite monofilament moves; said tube, the diameter of which is typically a few centimetres (for example 2 to 3 cm), is irradiated by a plurality (here, for example, 4) of UV irradiators (24) in a row ("UVAprint" lamps from Dr. Hönle, with a wavelength of 200 to 600 nm) arranged at a short distance (a few centimetres) from the glass tube.

Preferably, the irradiation chamber is several metres long, for example between 2 and 15 m, in particular between 3 and 10 m.

The irradiation tube 23 in this example has a stream of nitrogen flowing through it.

The irradiation conditions are preferably adjusted such that, at the outlet of the impregnation chamber, the temperature of the GRC monofilament measured at the surface thereof (for example by means of a thermocouple) is greater than the Tg of the crosslinked resin (in other words greater than 190° C.) and more preferably less than 270° C.

Once the resin has polymerized (cured), the GRC monofilament (25) which is now in the solid state and conveyed in the direction of the arrow F then arrives at the final receiving spool (26).

Figure 2:
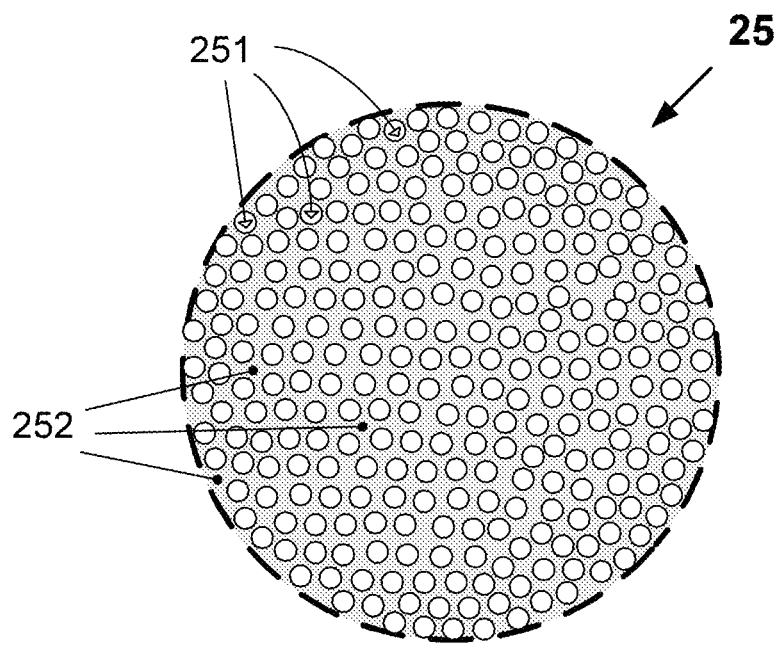

Finally, a finished, manufactured composite block is obtained as depicted very simply in FIG. 2, in the form of a continuous, very long GRC monofilament (25), the unitary glass filaments (251) of which are distributed homogeneously throughout the volume of cured resin (252). The diameter thereof is, for example, equal to approximately 1 mm.

By virtue of the operating conditions described above, the process of the invention may be carried out at high speed, greater than 50 m/min, preferably between 50 and 150 m/min, more preferably in a range from 60 to 120 m/min.

The GRC monofilament of the invention manufactured in this way can advantageously be used for reinforcing pneumatic or non-pneumatic tyres of all types of vehicles, in particular passenger vehicles or industrial vehicles such as heavy vehicles or civil engineering vehicles, aircraft and other transport or handling vehicles.

For the examples of application in pneumatic tyres described below, spools of 40 000 metres (i.e. close to 7 hours of continuous manufacture at a speed of 100 m/min) were produced, which clearly illustrates the industrial performance of the process described above.

Figure 3:
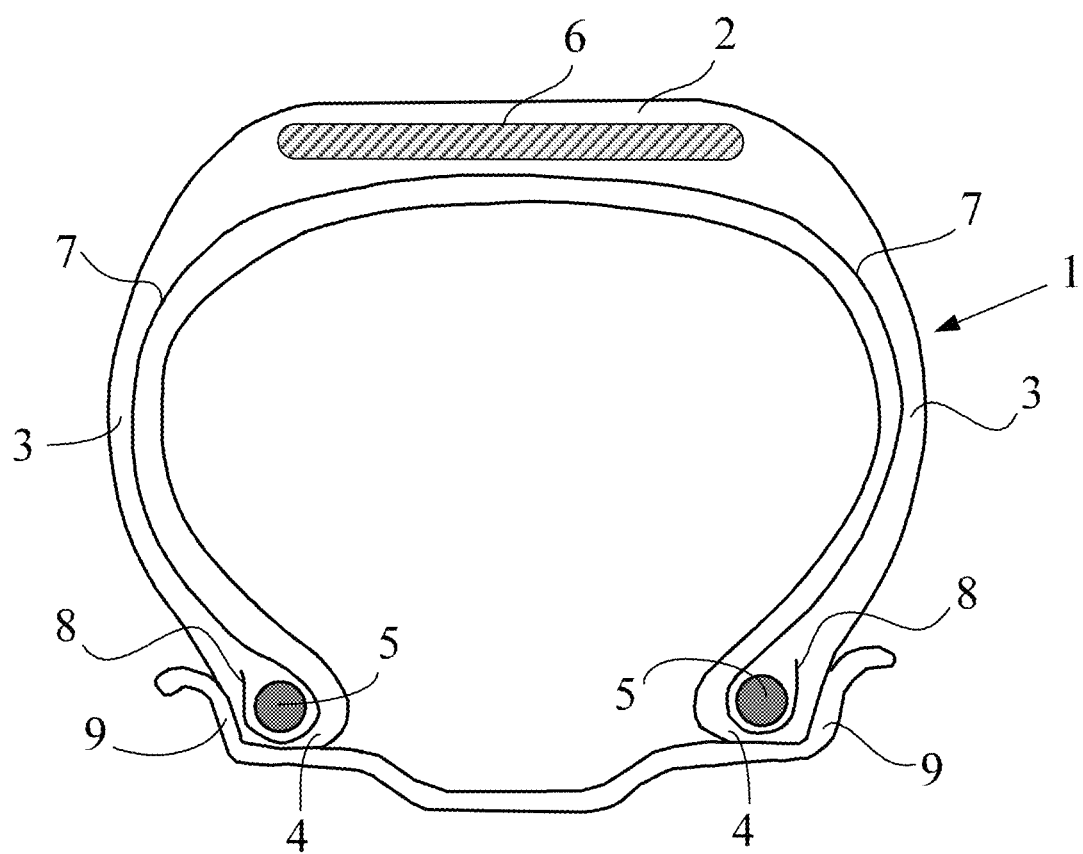

As an example, FIG. 3 illustrates, highly schematically (without being true to a specific scale) a radial section through a pneumatic tyre in accordance with the invention for a passenger vehicle.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not shown in this schematic figure. A carcass reinforcement 7 is wound around the two bead wires 5 in each bead 4, the turn-up 8 of this reinforcement 7 being, for example, positioned towards the outside of the tyre 1, which is here represented fitted onto its wheel rim 9.

The carcass reinforcement 7 is, in a way known per se, formed from at least one rubber ply reinforced by what are referred to as "radial" textile reinforcers, that is to say these reinforcers are arranged practically parallel to one another and extend from one bead to the other to form an angle of between 80° and 90° with the median circumferential plane (plane perpendicular to the axis of rotation of the tyre, which is situated halfway between the two beads 4 and passes through the middle of the crown reinforcement 6).

The belt 6 is for example formed, in a manner known per se, of at least two superposed and crossed rubber plies known as "working plies" or "triangulation plies", reinforced with metal cords positioned substantially parallel to one another and inclined relative to the median circumferential plane, it being possible for these working plies to be combined with other rubber fabrics and/or plies. The primary role of these working plies is to give the pneumatic tyre a high cornering stiffness. The belt 6 also comprises, in this example, a rubber ply referred to as "hooping ply", reinforced by what are referred to as "circumferential" reinforcing threads, that is to say these reinforcing threads are arranged practically parallel to one another and extend substantially circumferentially around the pneumatic tyre so as to form an angle preferably within a range from 0° to 10° with the median circumferential plane. It will be recalled that the primary role of these circumferential reinforcing threads is to withstand the centrifugation of the crown at high speed.

The tyre 1 of the invention has for example the essential feature that at least its belt (6) and/or its carcass reinforcement (7) comprises a GRC monofilament according to the invention. According to another possible exemplary embodiment of the invention, the bead zone may be reinforced with such a monofilament; the bead wires (5) may be formed, in whole or in part, of a GRC monofilament according to the invention.

The rubber compositions used for the rubber plies reinforced with the GRC monofilaments are conventional compositions for the calendering of textile reinforcers, typically based on natural rubber, carbon black or silica, a vulcanization system and the usual additives. By virtue of the invention, compared to rubber compositions reinforced with steel cords, the compositions advantageously have no metal salts such as cobalt salts. The GRC monofilament of the invention is adhesively bonded to the rubber layer which coats it in a known way, for example using a standard adhesive of RFL (resorcinol-formaldehyde-latex) type.

Specific tests on pneumatic tyres were carried out in which the GRC monofilaments were used as longilineal reinforcers, that is to say non-cabled reinforcers, in crossed working plies instead of conventional steel cords, as described in the aforementioned document EP 1 167 080.

These tests clearly demonstrated that the GRC monofilaments of the invention, by virtue of their improved properties in compression, did not undergo breakages in compression during the very manufacturing of these pneumatic tyres, unlike the GRC monofilaments of the prior art such as those described in EP 1 167 080.

While significantly lightening the pneumatic tyres and removing the risks associated with corrosion compared to tyres with a belt reinforced in the conventional way with steel cords, the GRC monofilaments of the invention revealed the other significant advantage of not increasing the rolling noise of the pneumatic tyres, unlike other known textile (reinforcer) solutions.

These GRC monofilaments of the invention also demonstrated excellent performance as circumferential reinforcers in non-pneumatic tyres such as those described in the introduction of this document.

The invention claimed is:

1. A monofilament made of glass-resin composite comprising glass filaments embedded in a crosslinked resin,
    wherein the glass transition temperature Tg of the resin is equal to or greater than 190° C.;
    wherein an elongation at break Eb of the monofilament, measured at 23° C., is equal to or greater than 4.0%;
    wherein an initial tensile modulus $E_{23}$ of the monofilament, measured at 23° C., is greater than 35 GPa; and
    wherein a real part of the complex modulus $E'_{190}$ of the monofilament, measured at 190° C. by the DMTA method, is greater than 30 GPa.

2. The monofilament according to claim 1, wherein the Tg of the resin is greater than 195° C.

3. The monofilament according to claim 2, wherein the Tg of the resin is greater than 200° C.

4. The monofilament according to claim 1, wherein the Eb is greater than 4.2%.

5. The monofilament according to claim 1, wherein the Eb is greater than 4.4%.

6. The monofilament according to claim 1, wherein an $E'_{(Tg'-25)}/E'_{23}$ ratio is greater than 0.85, $E'_{23}$ and $E'_{(Tg'-25)}$ being the real part of the complex modulus of the monofilament measured by DMTA, respectively, at 23° C. and at a temperature expressed in ° C. equal to Tg'-25, and Tg' being the glass transition temperature of the resin measured by DMTA.

7. The monofilament according to claim 6, wherein the $E'_{(Tg'-25)}/E'_{23}$ ratio is greater than 0.90, $E'_{23}$ and $E'_{(Tg'-25)}$ being the real part of the complex modulus of the monofilament measured by DMTA, respectively, at 23° C. and at a temperature expressed in ° C. equal to Tg'-25, and Tg' being the glass transition temperature of the resin measured by DMTA.

8. The monofilament according to claim 1, wherein an $E'_{(Tg'-10)}/E'_{23}$ ratio is greater than 0.80, $E'_{23}$ and $E'_{(Tg'-10)}$ being the real part of the complex modulus of the monofilament measured by DMTA, respectively, at 23° C. and at a temperature expressed in ° C. equal to Tg'-10, and Tg' being the glass transition temperature of the resin measured by DMTA.

9. The monofilament according to claim 8, wherein the $E'_{(Tg'-10)}/E'_{23}$ ratio is greater than 0.85, $E'_{23}$ and $E'_{(Tg'-10)}$ being the real part of the complex modulus of the monofilament measured by DMTA, respectively, at 23° C. and at a temperature expressed in ° C. equal to Tg'-10, and Tg' being the glass transition temperature of the resin measured by DMTA.

10. The monofilament according to claim 1, wherein the $E_{23}$ is greater than 40 GPa.

11. The monofilament according to claim 10, wherein the $E_{23}$ is greater than 42 GPa.

12. The monofilament according to claim 1, wherein the $E'_{190}$ is greater than 33 GPa.

13. The monofilament according to claim 12, wherein the $E'_{190}$ is greater than 36 GPa.

14. The monofilament according to claim 1, wherein an elastic deformation in compression under flexion is greater than 3.0%.

15. The monofilament according to claim 14, wherein the elastic deformation in compression under flexion is greater than 3.5%.

16. The monofilament according to claim 15, wherein the elastic deformation in compression under flexion is greater than 4.0%.

17. The monofilament according to claim 1, wherein a breaking stress in compression under flexion is greater than 1000 MPa.

18. The monofilament according to claim 17, wherein the breaking stress in compression under flexion is greater than 1200 MPa.

19. The monofilament according to claim 18, wherein the breaking stress in compression under flexion is greater than 1400 MPa.

20. The monofilament according to claim 1, wherein a weight content of the glass filaments is between 60 and 80%.

21. The monofilament according to claim 20, wherein the weight content of the glass filaments is between 65 and 75%.

22. The monofilament according to claim 1, wherein a density of the monofilament is between 1.8 and 2.1 g/cm$^3$.

23. The monofilament according to claim 1, wherein the resin is a vinyl ester resin.

24. The monofilament according to claim 1, wherein an initial tensile modulus of the resin, measured at 23° C., is greater than 3.0 GPa.

25. The monofilament according to claim 24, wherein the initial tensile modulus of the resin, measured at 23° C., is greater than 3.5 GPa.

26. The monofilament according to claim 1, wherein a diameter D of the monofilament is between 0.2 and 1.5 mm.

27. The monofilament according to claim 26, wherein the diameter D is between 0.3 and 1.2 mm.

28. The monofilament according to claim 27, wherein the diameter D is between 0.4 and 1.1 mm.

29. A finished article or semi-finished product made of rubber comprising a monofilament according to claim 1.

30. A pneumatic or non-pneumatic vehicle tire comprising a monofilament according to claim 1.

31. The pneumatic or non-pneumatic vehicle tire according to claim 30, wherein the monofilament is present in the belt or in the carcass reinforcement of the tire.

32. The pneumatic or non-pneumatic vehicle tire according to claim 30, wherein the monofilament is present in the bead zone of the tire.

\* \* \* \* \*